United States Patent
Cainey et al.

(10) Patent No.: US 12,450,271 B2
(45) Date of Patent: Oct. 21, 2025

(54) COMPUTERIZED SYSTEMS AND METHODS FOR SEMANTIC SEARCHING

(71) Applicant: WORKDAY, INC., Pleasanton, CA (US)

(72) Inventors: Joseph Cainey, London (GB); Jyoti Mishra, London (GB); Jakob Nielsen, Copenhagen (DK); Bjorn Arnholtz, Soborg (DK); Gary Engelbert, London (GB)

(73) Assignee: WORKDAY, INC., Pleasanton, CA (US)

( * ) Notice: Subject to any disclaimer, the term of this patent is extended or adjusted under 35 U.S.C. 154(b) by 0 days.

(21) Appl. No.: 17/707,335

(22) Filed: Mar. 29, 2022

(65) Prior Publication Data

US 2023/0315768 A1 Oct. 5, 2023

(51) Int. Cl.
*G06F 16/334* (2025.01)
*G06F 16/36* (2019.01)

(52) U.S. Cl.
CPC ............ *G06F 16/334* (2019.01); *G06F 16/36* (2019.01)

(58) Field of Classification Search
CPC ................................ G06F 16/334; G06F 16/36
See application file for complete search history.

(56) References Cited

U.S. PATENT DOCUMENTS

| | | | | |
|---|---|---|---|---|
| 11,392,651 | B1* | 7/2022 | McClusky | G06F 16/906 |
| 11,416,216 | B2* | 8/2022 | Anantharangachar | G06F 16/36 |
| 2018/0150551 | A1* | 5/2018 | Wang | G06F 16/338 |
| 2018/0165723 | A1* | 6/2018 | Wright | G06F 40/30 |
| 2018/0225372 | A1* | 8/2018 | Lecue | G06F 16/36 |
| 2018/0232443 | A1* | 8/2018 | Delgo | G06F 16/35 |
| 2020/0302018 | A1* | 9/2020 | Turkkan | G06F 16/3347 |
| 2020/0349199 | A1* | 11/2020 | Jayaraman | G06F 40/284 |
| 2023/0093756 | A1* | 3/2023 | Banerjee | G06Q 30/0633 705/26.7 |

OTHER PUBLICATIONS

Nasar et al., 2021. Named Entity Recognition and Relation Extraction: State-of-the-Art. ACM Comput. Surv. 54, 1, Article 20 ( Feb. 2021), 39 pages—relevant pp. 12-28. (Year: 2021).*

* cited by examiner

*Primary Examiner* — Matthew J Ellis
(74) *Attorney, Agent, or Firm* — James J. DeCarlo; Greenberg Traurig, LLP (57) ABSTRACT

Disclosed are systems and methods for a semantic search framework that operates to provide a robust search feature of database hosted data. The disclosed framework (or tool) improves and expands how searches can be configured and executed. In some embodiments, the disclosed framework is configured to receive a search request for a term or phrase, contextualize it to a generally understood theme that is not hindered by language barriers, and leverage it in a manner that is able to retrieve the most relevant and accurate results. The disclosed framework can filter search requests in a manner that both expands its breadth while honing in on what is actually being requested. The disclosed framework can be embodied as computerized systems and methods that can topically search for content based on a query string (e.g., term or phrase), and output a results set that embodies the theme of a survey's feedback.

17 Claims, 4 Drawing Sheets

COMPUTERIZED SYSTEMS AND METHODS FOR SEMANTIC SEARCHING

BACKGROUND

Surveys serve as important resources for entities (e.g., companies) and their managers to collect information from parties (e.g., users or employees). In certain circumstances, surveys can be used to drive productivity and enable better decision making.

In most surveys, in addition to user's being afforded opportunities to provide feedback to set of questions, users are also capable of providing comments. Such comments can be in relation to, but not limited to, the context of a question, the context of a provided answer, and/or any other type of information that can be deemed relevant to a particular question, set of questions, responding user, company, department, survey, and the like, or some combination thereof.

SUMMARY

Surveys can enable robust data collection and generation. The responses and comments that accompany such surveys can provide a deep reservoir of information that companies can utilize to develop and/or cultivate their products, network, hierarchy, deals/transactions and/or culture.

Presently known systems for mining the data collected from surveys fall short of being able to adequately understand and identify the data specific to certain types of queries. For example, if a department of users responds to a survey and provides comments, existing systems are incapable of filtering or drilling down on what exactly the responding users are saying (i.e., what messages their comments are relaying or the meaning of their statements). Current systems can score and can use existing natural language processing (NLP) techniques; however, they are only capable of identifying terms that directly correspond to queried terms. For example, if a human resources (HR) department is attempting to understand the consensus of "diversity" or "gender equality" within the ranks of their employees, their existing search tools are limited to existing search functionality (e.g., exact search matches based searches that are enabled via a plurality of related searches or search terms, for example, Boolean searches). Thus, searching via existing tools would only surface comments that include the queried terms (e.g., diversity or gender equality).

The disclosed systems and methods overcome these technical shortcomings and others by providing a novel semantic search framework (or tool) that improves and expands how searches can be configured and executed. As discussed herein, the disclosed framework is configured to receive a search request for a term or phrase, contextualize it to an understood theme (or meaning) that is not hindered by language barriers, and leverage it in a manner that is able to retrieve the most contextually relevant and accurate results. Thus, the disclosed framework can filter search requests in a manner that both expands its breadth, while honing in on what is actually being requested.

The disclosed framework can be embodied as computerized systems and methods that can topically search for content based on a query string (e.g., term or phrase), and output a results set that embodies the theme of a survey's feedback. In other words, the disclosed framework moves past simply keyword(s) identification, and identifies search results based on their meaning.

In accordance with one or more embodiments, the present disclosure provides computerized methods for a search framework that performs semantic searching of database hosted data for the most relevant forms of data pertaining to particular types of queried information.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device cause at least one processor to perform a method for a search framework that performs semantic searching of database hosted data for the most relevant forms of data pertaining to particular types of queried information.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Figure 1:
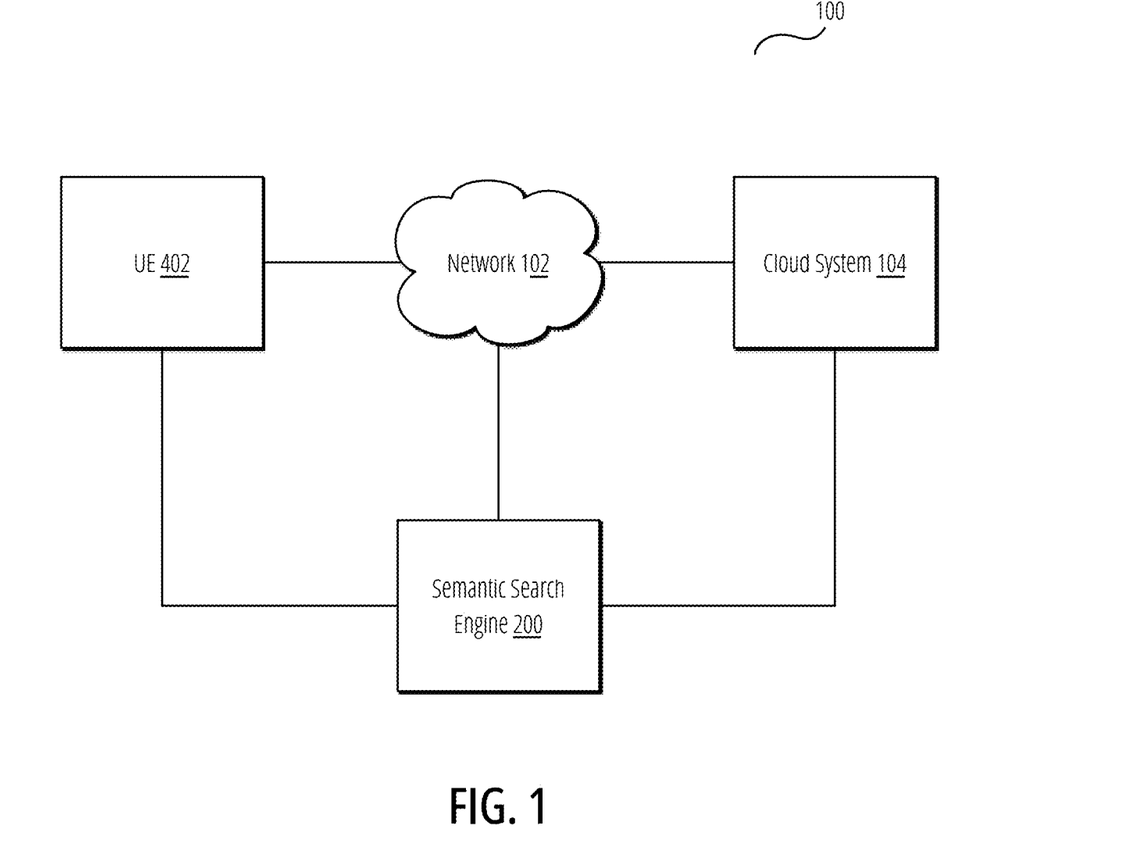
FIG. 1 is a block diagram of an example configuration within which the systems and methods disclosed herein could be implemented according to some embodiments of the present disclosure.

With reference to FIG. 1, system 100 is depicted which includes UE 402 (e.g., a client device, as mentioned above), network 102, cloud system 104 and semantic search engine 200. UE 402 can be any type of device, such as, but not limited to, a mobile phone, tablet, laptop, sensor, Internet of Things (IoT) device, autonomous machine, and any other device equipped with a cellular or wireless or wired transceiver. Further discussion of UE 402 is provided below in reference to FIG. 4.

Network 102 can be any type of network, such as, but not limited to, a wireless network, cellular network, the Internet, and the like (as discussed above). Network 102 facilitates connectivity of the components of system 100, as illustrated in FIG. 1.

Cloud system 104 can be any type of cloud operating platform and/or network based system upon which applications, operations, and/or other forms of network resources can be located. For example, system 104 can be a service provider and/or network provider from where services and/or applications can be accessed, sourced or executed from. In some embodiments, cloud system 104 can include a server(s) and/or a database of information which is accessible over network 102. In some embodiments, a database (not shown) of cloud system 104 can store a dataset of data and metadata associated with local and/or network information related to a user(s) of UE 402 and/or the UE 402, and the services and applications provided by cloud system 104 and/or semantic search engine 200.

Semantic search engine 200, as discussed herein in more detail, includes components for optimizing how searches of survey related data (e.g., the survey's themselves, as well as the feedback from respondents) can be executed. According to some embodiments, semantic search engine 200 can be a special purpose machine or processor and could be hosted by a device on network 102, within cloud system 104 and/or on UE 402. In some embodiments, engine 200 can be hosted by a peripheral device connected to UE 402.

According to some embodiments, as discussed above, semantic search engine 200 can function as an application provided by cloud system 104. In some embodiments, engine 200 can function as an application installed on UE 402. In some embodiments, such application can be a web-based application accessed by UE 402 over network 102 from cloud system 104 (e.g., as indicated by the connection between network 102 and engine 200, and/or the dashed line between UE 402 and engine 200 in FIG. 1). In some embodiments, engine 200 can be configured and/or installed as an augmenting script, program or application (e.g., a plug-in or extension) to another application or program provided by cloud system 104 and/or executing on UE 402.

Figure 2:
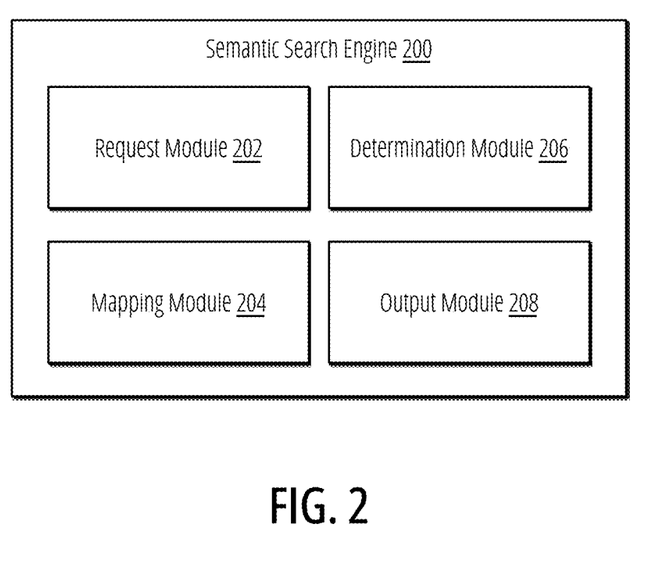
FIG. 2 is a block diagram illustrating components of an exemplary system according to some embodiments of the present disclosure.

As illustrated in FIG. 2, according to some embodiments, semantic search engine 200 includes request module 202, mapping module 204, determination module and output module 206. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIG. 3.

Figure 3:
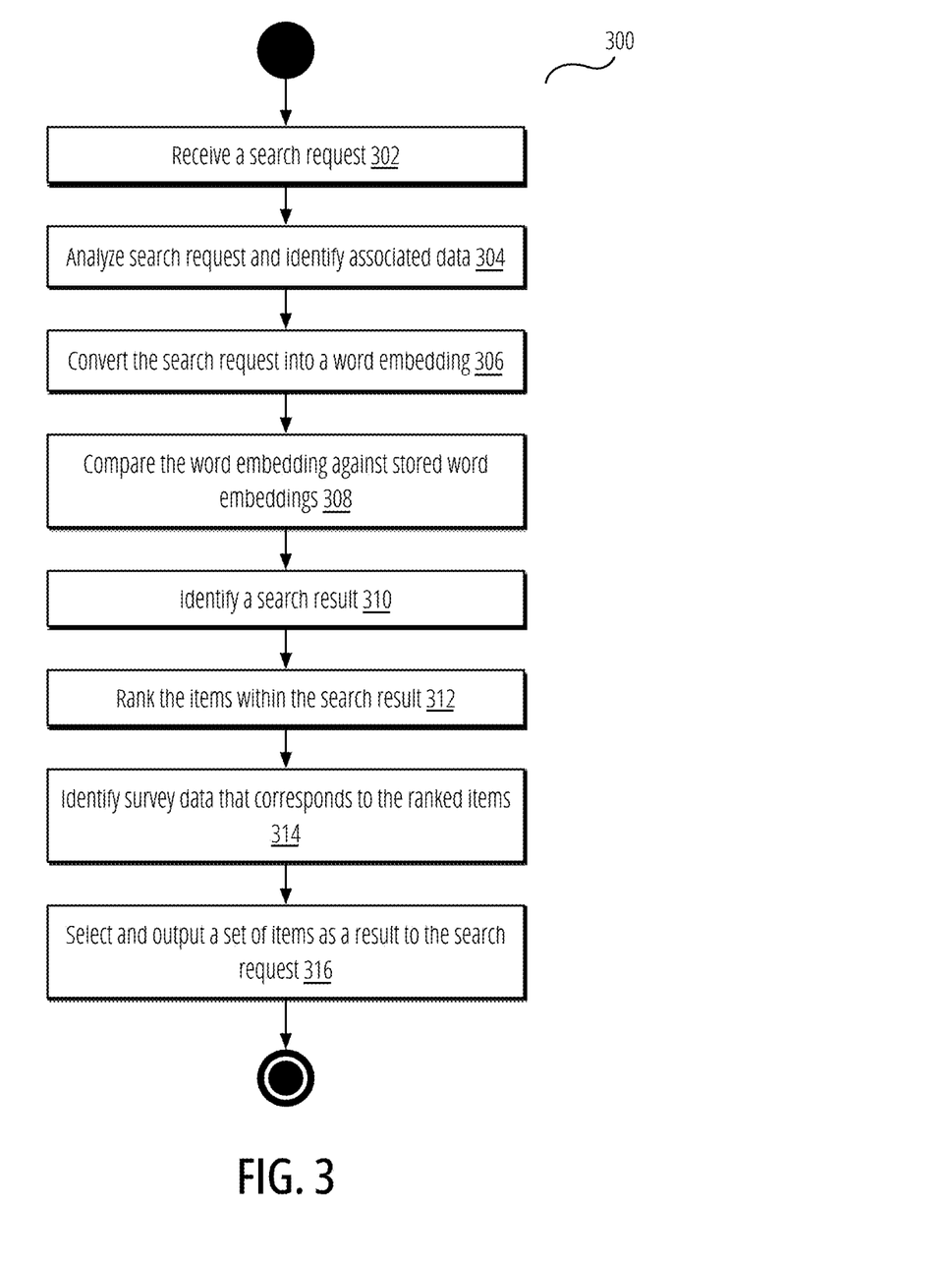
FIG. 3 illustrates an exemplary data flow according to some embodiments of the present disclosure.

FIG. 3 provides Process 300 which details non-limiting example embodiments of the disclosed assessment framework's operations for performing a semantic search of database hosted data. As discussed below in more detail, according to some embodiments, semantic search framework 200 can operate to optimize search requests in order to more accurately and precisely retrieve the data being requested from the database.

According to some embodiments, Step 302 of Process 300 can be performed by request module 202 of semantic search engine 200; Steps 304-306 can be performed by mapping module 204; Steps 308-312 can be performed by determination module 206; and Steps 314-316 can be performed by output module 208.

Process 300 begins with Step 302 where a search request is received. In some embodiments, the request can comprise a character string. In some embodiments, the character string can correspond to a term, terms and/or a phrase.

In some embodiments, the character string can have a context with a defined meaning. For example, the search request can comprise the string "Efforts to support diversity and a diverse workforce." This has a specific meaning that corresponds to how diverse the workforce is and what efforts are being taken to ensure and maintain such diversity. As discussed below, this meaning is flushed out and leveraged to identified survey data (e.g., comments) that are contextually relevant.

As discussed above, the search request can be an attempt to identify and retrieve data collected from surveys that is housed in a database. The survey data can include user answers to questions of a survey and comments provided by each of the users, as discussed above. In some embodiments, such data can be stored in association with each other (e.g., in relation to the responding users (e.g., respondents) and/or in relation to specific surveys or questions). In some embodiments, such data can be stored according to any type of known or to be known hierarchy or configuration of a data store, such as, but not limited to, a look-up table (LUT), blockchain, object-orientated, relational, and/or any other form of DMS. In some embodiments, the survey data can be formatted and stored as word embeddings, as discussed below.

In Step 304, the search request is analyzed, and based on the analysis, data associated with the request is identified. In some embodiments, such data can include, but is not limited to, meaning of the character string, an identity (ID) of the requesting user/entity, a time stamp, location of the requestor, position (or title) of the requestor, network address of the requestor, access rights, length of search request, and the like, or some combination thereof.

According to some embodiments, such analysis and identification can be performed via engine 200 executing any type of known or to be known computational analysis, NLP, neural network or classifier that can parse, identify and characterize the search request to determine the information included therein and the meaning of such information.

In Step 306, based on the identified data from Step 304, engine 200 can convert the search request into a representative search vector. According to some embodiments, the search vector can be created using any type of known or to be known vectorization algorithm or technique, and can result in a n-dimensional vector that represents the data identified from Step 304.

According to some embodiments, the search vector can be configured as a word embedding (or embedding, used interchangeably), which is understood to be a conversion of the search query and its character string via NLP, neural networks, and/or any other type of syntactic parsing, sentiment analysis and/or language modelling. Therefore, according to some embodiments, the word embedding at least characterizes a universally understood meaning of the search request, regardless of language, structure and/or format of the search request/character string.

According to some embodiments, the vectorization or conversion to embeddings enables the meaning of the search request (from Step 302) to be determined for purposes of identifying relevantly stored data. For example, if the search request is in Spanish, yet the stored query is in English, there is no need for translation, as the usage of the word embeddings of the search query and stored data enables a streamlined comparison between the meaning of the terms.

In some embodiments, the converted word embedding of the search request can be stored in the database for recursive learning/training of engine 200 to more accurately and efficiently convert and search similar types of requests in the future. In some embodiments, the storage of such embeddings can be utilized to recommend search terms or search topics to other users performing searches of the database.

In Step 308, engine 200 compares the word embedding created in Step 306 against embeddings stored in the database. The comparison enables the identification of a search result set that includes word embeddings related to survey data (e.g., feedback and comments) that corresponds to the meaning of the search request (from Step 302), as in Step 310. According to some embodiments, the comparison can be based on a similarity threshold, such that any terms that are within the similarity threshold can be included in the results set of Step 310.

As one example, a search request for term X which means Y may be received. The database stores data A, B & C. Via the processing discussed above in relation to at least Steps 302-310, engine 200 can determine that X means Y, formulate an embedding for X that is defined as Y, and analyze A, B & C and determine if any of them also mean Y. Upon doing so, engine 200 can discern which stored data actually corresponds to the search by by-passing particular forms of syntax and delving into the actual meaning of the term(s). The ultimate selection of A, B, and/or C can be made based on determining how similar A, B, or C is to Y within a similarity threshold. In some embodiments, the similarity between Y and A, B, or C can be represented numerically. For example, the cosine distance between Y and A, B, or C, can be computed and used as a numerical representation of the similarity between Y and A, B, or C. As described herein, the similarity threshold can be used to ensure that the distance between Y and A, B, or C is close enough such that only relevant database entries are returned. That is, the similarity threshold acts as a filter to filter out results that are too dissimilar to the input.

In a first embodiment, the similarity threshold can comprise a fixed threshold. In some embodiments, a fixed threshold can comprise a numerical constant that defines how similar two vectors must be. For example, if cosine similarity is used as the measure of similarity, the measured similarity is between negative one and positive one. In some embodiments, the similarity can be normalized to a value between zero (e.g., opposite) and one (e.g., proportional), which is used in the following examples. Using a fixed threshold, the measured similarity can be compared to a fixed value and then a decision can be made as to whether the measured similarity is above, equal to, or below the fixed threshold. For example, if the fixed threshold is set at 0.8 and the measured similarity between an input vector (Y) and a result vector (e.g., A, B, or C) is 0.95, process 300 can determine that the input and result vectors are sufficiently similar. Conversely, if the same fixed threshold is used and the measured similarity between an input vector (Y) and a result vector (e.g., A, B, or C) is 0.7 or 0.1, process 300 can determine that the input and result vectors are not sufficiently similar and discard the result vector from the search results. In some embodiments, the fixed threshold can be set in advance based on tuning the engine 200.

In a second embodiment, the similarity threshold can be set dynamically. In this embodiment, the similarity threshold can be set using a binary search technique on a global set of matching result vectors. In this embodiment, a minimum and maximum similarity threshold are first used to segment a candidate set of result vectors. In some embodiments, the minimum and maximum similarity thresholds can be fixed thresholds (discussed above) that filter out high and low similarity results. In some embodiments, the maximum similarity threshold can be a high match threshold (e.g., cosine similarity of one) and the minimum threshold can be a value less than completely opposite similarity (e.g., cosine similarity of 0.2 using the normalized scale described above). The specific minimum and maximum similarity thresholds are not limiting. After filtering the results using the minimum and maximum similarity thresholds, process 300 can stratify the results into various sub-bands based on the distribution of results. For example, if the minimum and maximum similarity threshold are 0.2 and 1.0, process 300 can divide the results into four bands [0.2, 0.4], [0.4, 0.6], [0.6, 0.8], [0.8, 1.0], where each band is associated with result vectors having a corresponding similarity measurement within the bands. Next, process 300 can select a random result vector from each band and present the random result vectors (in human-readable form) to a user. In response, the user can select the most relevant result vectors. Process 300 can receive this selection and inspect the score of the selected result vectors. Process 300 can then select the similarity threshold based on the selected result vectors. For example, process 300 can pick the lowest-scoring selected result vector and use the corresponding score as a threshold (and execute the fixed threshold embodiment discussed previously). In another embodiment, process 300 can identify the sub-band of the lowest-scoring selected result vector and pick either the upper or lower bound of that sub-band as the similarity threshold (and execute the fixed threshold embodiment discussed previously). In another embodiment, after identifying the sub-band using the above approaches, the average score in the sub-band can be calculated and used as the similarity threshold. While the lowest-scoring selected result vector is chosen, the high-scoring result vector may also be used in a similar manner. Thus, in the foregoing embodiment, a user-selected threshold can be used with assistance by process 300 to limit the potential candidates for human review.

In a third embodiment, an artificial intelligence (AI) or machine learning (ML) approach can be used to set the similarity threshold. In this embodiment, the search phrase vector (e.g., X) and/or the input vector (e.g., Y) is used as an input into a predictive model which can output a similarity threshold. In some embodiments, the similarity threshold can be represented as a continuous value (e.g., between zero and one). In these embodiments, various types of regression models such as linear regression, Naïve Bayes, random forest, neural network, boosted decision tree, etc. To train such a model, training data can be obtained for a given set of input vectors. In general, the training data can comprise input vectors and corresponding similarity thresholds. In some embodiments, the previous embodiment (wherein users can select similarity thresholds via a binary search) can be used to generate training labels for a given input. In this manner, the model can be trained simultaneously while using the previous embodiment. In some embodiments, the model can be used to predict a similarity threshold. If no matches are found using the predicted similarity threshold, process 300 can fall back to the previous binary search embodiment, and (if necessary) further fall back to a fixed threshold to ensure results are delivered.

Continuing with Process 300, in Step 312 the search results are ranked. In some embodiments, the search result from Step 310 can comprise a set of items that are determined to have a similar meaning to the search request. In Step 312, these results can be ranked based on how similar they are determined to be. In some embodiments, the result items that are more similar are ranked higher.

In Step 314, engine 200 can identify the survey data (e.g., comments) from within the database that is associated with the ranked word embedding(s). In some embodiments, this can involve reverse transforming the word embeddings and identifying the corresponding data items within the database (e.g., identify the comment that corresponds each embedding). In some embodiments, such transformation can be performed in a similar manner as discussed above in relation to at least Step 306. In some embodiments, the stored embeddings can have a pointer within the DMS that identifies its corresponding data, which can be used to identify and retrieve the corresponding data.

In some embodiments, the identification of embeddings' corresponding survey data can be performed after the selection of relevant results (e.g., Step 316, as discussed below).

In Step 316, the survey data related to the ranked results can be selected and output for display on a page (e.g., web page or user interface (UI)) to the requesting user. In some embodiments, as mentioned above, a ranked result can be selected, then have its corresponding survey data retrieved and displayed.

In some embodiments, engine 200 can automatically select at least one of the ranked results for display, and in some embodiments, such selection can be based on the ranking in Step 312 (e.g., the highest ranked item(s)). In some embodiments, the ranked list (or at least a portion of it) can be displayed, which can enable the requesting user (or an administrator or other user) to select the results that are to be output as a response to the search request (or filter further, as discussed below). Thus, Step 316 provides semantically relevant results to the search request.

According to some embodiments, displayed results can be further narrowed according to a set of criteria that includes, but is not limited to, question set, date period, net promotor score (NPS) category, interactions, acknowledgements, and/or any other type of criteria that can narrow a results set. In some embodiments, such filtering can be enabled via displayed tools or interface objects on the results page that enables the further filtering.

Figure 4:
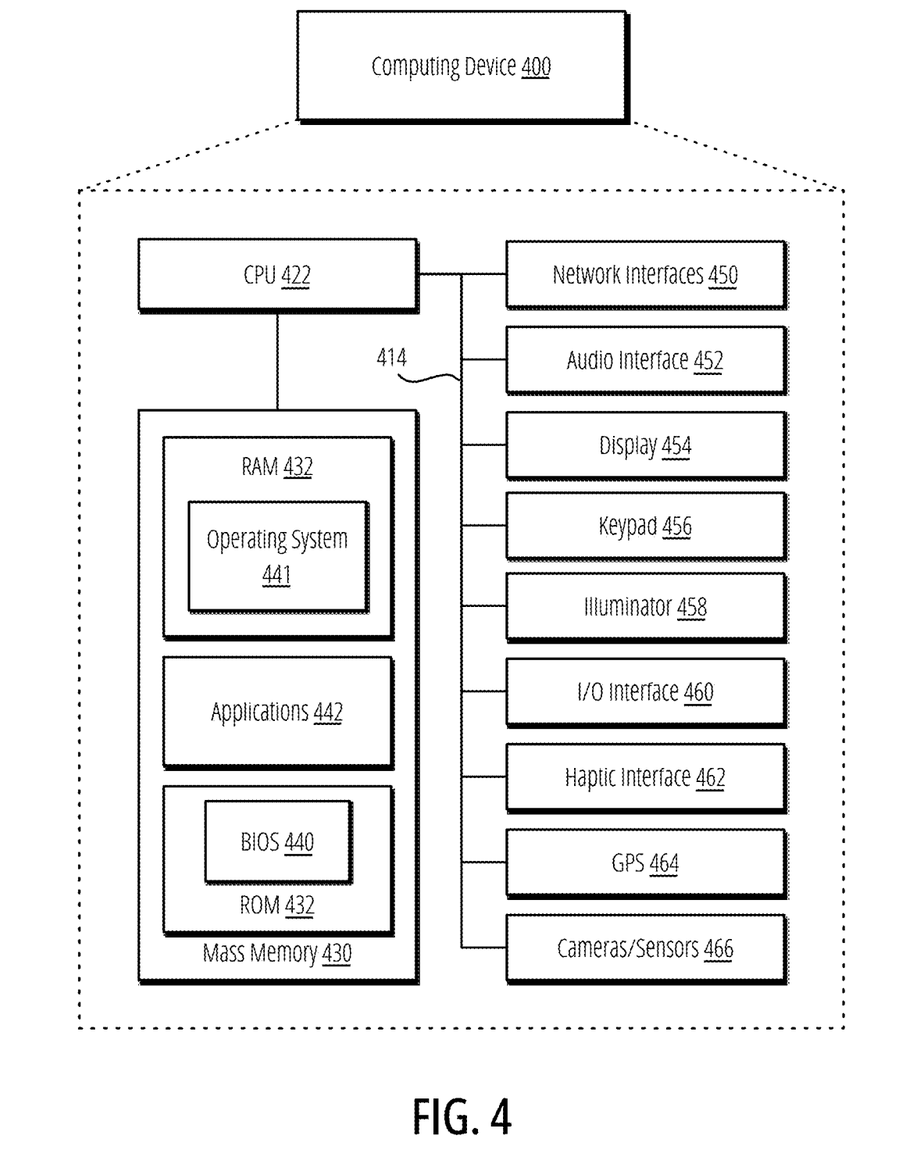
FIG. 4 is a block diagram illustrating a computing device showing an example of a client or server device used in various embodiments of the present disclosure.

FIG. 4 is a block diagram illustrating a computing device 400 showing an example of a client or server device used in the various embodiments of the disclosure. Computing device 400 can be a representation of UE 402, as mentioned above.

The computing device 400 may include more or fewer components than those shown in FIG. 4, depending on the deployment or usage of the device 400. For example, a server computing device, such as a rack-mounted server, may not include audio interfaces 452, displays 454, keypads 456, illuminators 458, haptic interfaces 462, GPS receivers 464, or cameras/sensors 466. Some devices may include additional components not shown, such as graphics processing unit (GPU) devices, cryptographic co-processors, artificial intelligence (AI) accelerators, or other peripheral devices.

As shown in FIG. 4, the device 400 includes a central processing unit (CPU) 422 in communication with a mass memory 430 via a bus 424. The computing device 400 also includes one or more network interfaces 450, an audio interface 452, a display 454, a keypad 456, an illuminator 458, an input/output interface 460, a haptic interface 462, an optional GPS receiver 464 (and/or an interchangeable or additional GNSS receiver) and a camera(s) or other optical, thermal, or electromagnetic sensors 466. Device 400 can include one camera/sensor 466 or a plurality of cameras/sensors 466. The positioning of the camera(s)/sensor(s) 466 on the device 400 can change per device 400 model, per device 400 capabilities, and the like, or some combination thereof.

In some embodiments, the CPU 422 may comprise a general-purpose CPU. The CPU 422 may comprise a single-core or multiple-core CPU. The CPU 422 may comprise a system-on-a-chip (SoC) or a similar embedded system. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system ("BIOS") 440 for controlling the low-level operation of the computing device 400. The mass memory also stores an operating system 441 for controlling the operation of the computing device 400.

Applications 442 may include computer-executable instructions which, when executed by the computing device 400, perform any of the methods (or portions of the methods) described previously in the description of the preceding Figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to RAM 432 again.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The optional GPS transceiver 464 can determine the physical coordinates of the computing device 400 on the surface of the Earth, which typically outputs a location as latitude and longitude values.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a device, a search request comprising a character string;
   converting, by the device, the search request into a word embedding as an n-dimensional search vector using a machine learning model;
   comparing, by the device, the word embedding against a plurality of word embeddings;
   determining, by the device, a similarity measure between the word embedding and each of the plurality of word embeddings stored in a database, wherein the plurality of word embeddings correspond to survey data comprising user responses to survey questions and user-provided comments relating to the survey questions, wherein the survey data is collected from respondents and includes structured feedback ratings and unstructured textual comments;
   determining a similarity threshold by generating a set of sub-bands, each sub-band associated with different minimum and maximum similarity measures, selecting random word embeddings from each sub-band, receiving a user selection of at least one of the random word embeddings to use as a search result, and setting the similarity threshold based on a similarity measure of the user-selected random word embedding;
   comparing, by the device, each determined similarity measure to the similarity threshold;
   identifying, by the device, a set of word embeddings, wherein each word embedding in the set of word embeddings has a similarity measure at least satisfying the similarity threshold;
   identifying, by the device, a set of terms comprising survey data terms that corresponds to the set of word embeddings by reverse transforming the word embeddings to retrieve the original survey comments and responses;
   outputting, by the device, for display within a graphical user interface having interactive filtering tools, the survey data terms in ranked order with corresponding relevance scores, wherein the graphical user interface enables further filtering of results, the set of terms;
   storing the word embedding and a search result relevance label in a database; and
   re-training the machine learning model using the stored word embedding and the search result relevance label.

2. The method of claim 1, further comprising:
   analyzing, by the device, the search request; and
   identifying, by the device, data and metadata related to the search request, wherein a conversion of the search request is based on the identified data and metadata.

3. The method of claim 2, wherein the data and metadata related to the search request corresponds to at least one of the defined meaning, an identity (ID) of a user associated with the search request, a time stamp, location, position (or title) of the user, network address of a device of the user, access rights of the user and length of search request.

4. The method of claim 1, wherein the plurality of word embeddings relate to at least one of feedback from a survey and comments provided by a respondent to a survey.

5. The method of claim 1, further comprising using a fixed value as the similarity threshold.

6. The method of claim 1, further comprising determining the similarity threshold by:
generating a set of sub-bands, each sub-band in the set of sub-bands associated with a minimum and maximum similarity and a subset of the plurality of word embeddings;
selecting random word embeddings from each sub-band in the set of sub-bands;
receiving a selection of a random word embedding from the random word embeddings; and
using a similarity measurement of the random word embedding to generate the similarity threshold.

7. A non-transitory computer-readable storage medium for tangibly storing computer program instructions capable of being executed by a computer processor, the computer program instructions defining steps of:
receiving a search request comprising a character string;
converting the search request into a word embedding as an n-dimensional search vector using a machine learning model;
comparing the word embedding against a plurality of word embeddings;
determining a similarity measure between the word embedding and each of the plurality of word embeddings stored in a database, wherein the plurality of word embeddings correspond to survey data comprising user responses to survey questions and user-provided comments relating to the survey questions, wherein the survey data is collected from respondents and includes structured feedback ratings and unstructured textual comments;
determining a similarity threshold by generating a set of sub-bands, each sub-band associated with different minimum and maximum similarity measures, selecting random word embeddings from each sub-band, receiving a user selection of at least one of the random word embeddings to use as a search result, and setting the similarity threshold based on a similarity measure of the user-selected random word embedding;
comparing each determined similarity measure to the similarity threshold;
identifying a set of word embeddings, wherein each word embedding in the set of word embeddings has a similarity measure at least satisfying the similarity threshold;
identifying a set of terms comprising survey data terms that corresponds to the set of word embeddings by reverse transforming the word embeddings to retrieve the original survey comments and responses;
outputting for display within a graphical user interface having interactive filtering tools, the survey data terms in ranked order with corresponding relevance scores, wherein the graphical user interface enables further filtering of results, the set of terms;
storing the word embedding and a search result relevance label in a database; and
re-training the machine learning model using the stored word embedding and the search result relevance label.

8. The non-transitory computer-readable storage medium of claim 7, the steps further comprising:
analyzing the search request; and
identifying data and metadata related to the search request, wherein a conversion of the search request is based on the identified data and metadata.

9. The non-transitory computer-readable storage medium of claim 8, wherein the data and metadata related to the search request corresponds to at least one of the defined meaning, an identity (ID) of a user associated with the search request, a time stamp, location, position (or title) of the user, network address of a device of the user, access rights of the user and length of search request.

10. The non-transitory computer-readable storage medium of claim 7, wherein the plurality of word embeddings relate to at least one of feedback from a survey and comments provided by a respondent to a survey.

11. The non-transitory computer-readable storage medium of claim 7, the steps further comprising using a fixed value as the similarity threshold.

12. The non-transitory computer-readable storage medium of claim 7, the steps further comprising determining the similarity threshold by:
generating a set of sub-bands, each sub-band in the set of sub-bands associated with a minimum and maximum similarity and a subset of the plurality of word embeddings;
selecting random word embeddings from each sub-band in the set of sub-bands;
receiving a selection of a random word embedding from the random word embeddings; and
using a similarity measurement of the random word embedding to generate the similarity threshold.

13. A device comprising:
a processor configured to:
receive a search request comprising a character string;
convert the search request into a word embedding as an n-dimensional search vector using a machine learning model;
compare the word embedding against a plurality of word embeddings;
determine a similarity measure between the word embedding and each of the plurality of word embedding stored in a database, wherein the plurality of word embeddings correspond to survey data comprising user responses to survey questions and user-provided comments relating to the survey questions, wherein the survey data is collected from respondents and includes structured feedback ratings and unstructured textual comments;
determining a similarity threshold by generating a set of sub-bands, each sub-band associated with different minimum and maximum similarity measures, selecting random word embeddings from each sub-band, receiving a user selection of at least one of the random word embeddings to use as a search result, and setting the similarity threshold based on a similarity measure of the user-selected random word embedding;
compare each determined similarity measure to the similarity threshold;
identify a set of word embeddings, wherein each word embedding in the set of word embeddings has a similarity measure at least satisfying the similarity threshold;

identify a set of terms comprising survey data terms that corresponds to the set of word embeddings by reverse transforming the word embeddings to retrieve the original survey comments and responses;

output, for display within a graphical user interface having interactive filtering tools, the survey data terms in ranked order with corresponding relevance scores, wherein the graphical user interface enables further filtering of results, the set of terms;

store the word embedding and a search result relevance label in a database; and re-train the machine learning model using the stored word embedding and the search result relevance label.

14. The device of claim 13, the processor further configured to:

analyze the search request; and identify data and metadata related to the search request, wherein a conversion of the search request is based on the identified data and metadata.

15. The device of claim 13, wherein the plurality of word embeddings relate to at least one of feedback from a survey and comments provided by a respondent to a survey.

16. The device of claim 13, the processor further configured to use a fixed value as the similarity threshold.

17. The device of claim 13, the processor further configured to determine the similarity threshold by:

generating a set of sub-bands, each sub-band in the set of sub-bands associated with a minimum and maximum similarity and a subset of the plurality of word embeddings;

selecting random word embeddings from each sub-band in the set of sub-bands;

receiving a selection of a random word embedding from the random word embeddings; and using a similarity measurement of the random word embedding to generate the similarity threshold.

* * * * *